United States Patent [19]

Melzian

[11] 4,327,929
[45] May 4, 1982

[54] RIDE-ON TRICYCLE

[75] Inventor: John M. Melzian, Palos Verdes Estates, Calif.

[73] Assignee: Mattel, Inc., Hawthorne, Calif.

[21] Appl. No.: 12,527

[22] Filed: Feb. 15, 1979

[51] Int. Cl.³ .................. B62K 9/02; B62K 19/16
[52] U.S. Cl. ............................ 280/282; 280/281 R
[58] Field of Search ......... 280/281 R, 281 LP, 281 B, 280/282

[56] References Cited

U.S. PATENT DOCUMENTS

| D. 176,037 | 11/1955 | Rhoades | 280/281 B |
|---|---|---|---|
| 2,479,538 | 8/1949 | Liljenberg | 280/282 |
| 3,062,559 | 11/1962 | Hewitt | 280/282 |
| 3,857,583 | 12/1974 | Vanover | 280/282 |
| 3,909,043 | 9/1975 | Black | 280/282 |

Primary Examiner—Randolph A. Reese
Assistant Examiner—Donn McGiehan
Attorney, Agent, or Firm—Reagin & King

[57] ABSTRACT

A child's tricycle having a generally U-shaped frame member mounting a steerable front wheel at its center and a pair of caster-mounted rear wheels at its open ends. The tricycle has a seat which mounts to the rear of the frame and depends therefrom so that the tricycle has an extremely low center of gravity and provides protection for the child on all sides.

4 Claims, 6 Drawing Figures

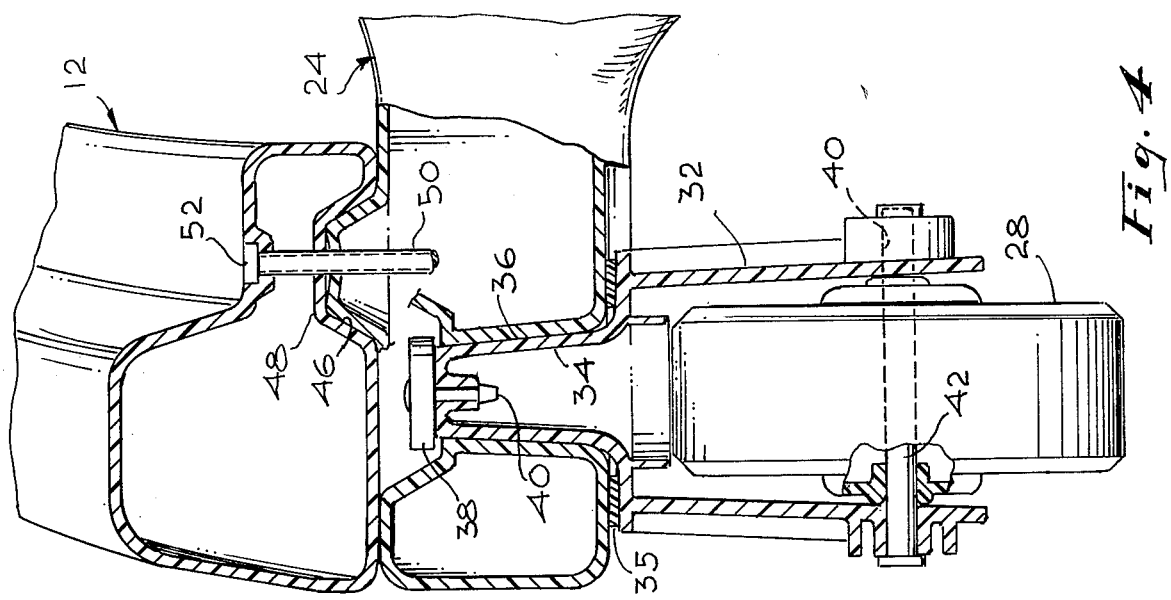
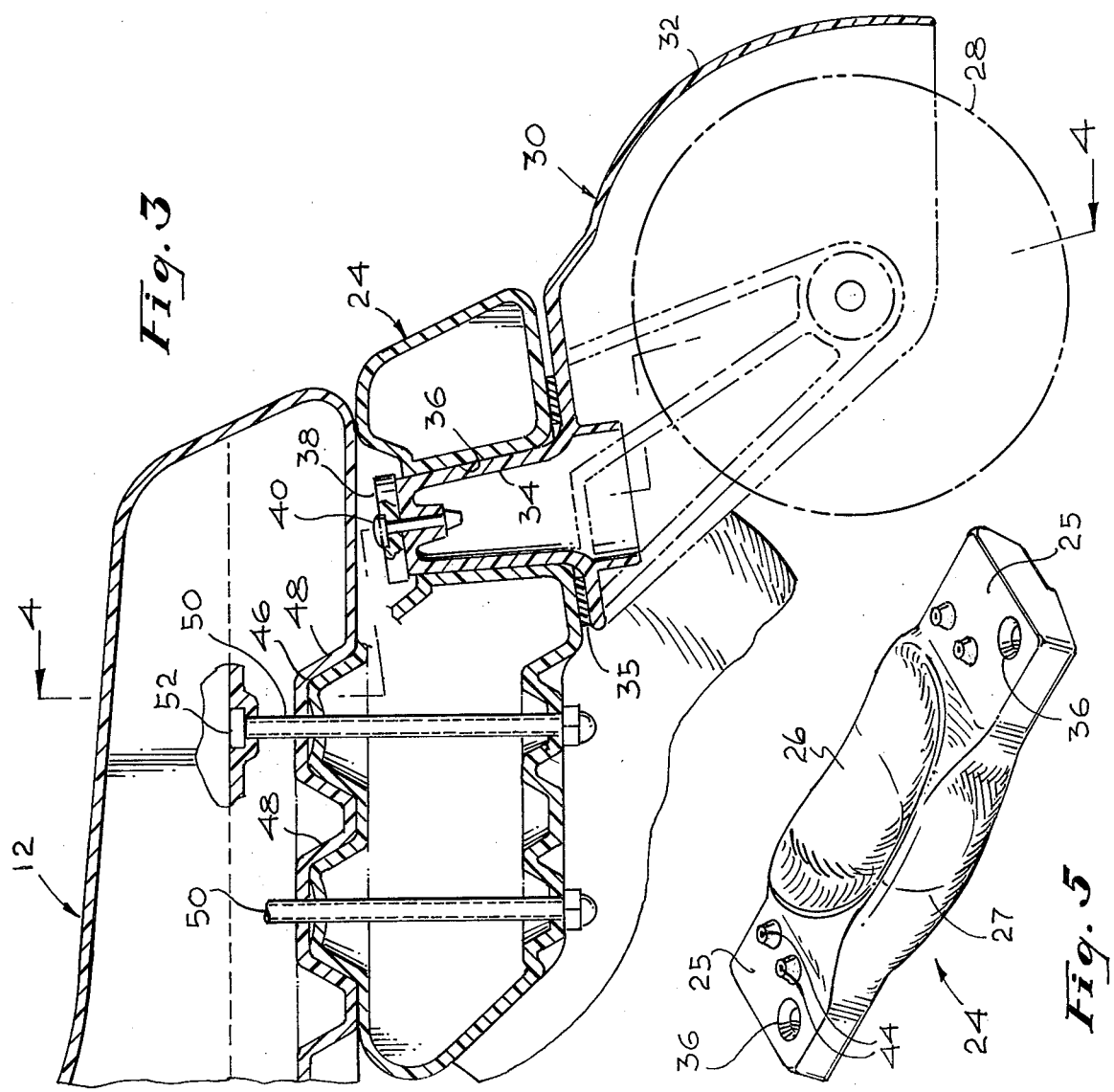

RIDE-ON TRICYCLE

BACKGROUND OF THE INVENTION

The background of the invention will be discussed in two parts:

1. Field of the Invention

This invention relates to toys and, more particularly, to ride-on tricycle toys.

2. Description of the Prior Art

There have been a myriad of toys developed over the years for use by children of all ages. Many of these toys have become classics and have been reproduced again and again. Those toys which have lasted have certain common characteristics. First, they provide a substantial amount of excitement for the child. Second, they are well made and durable so that the child may play with them over a long period of time. Next, they are sufficiently inexpensive so that they appeal to a broad market. Finally, and especially more recently, such toys are safe to use. Meeting all of these criteria has posed a substantial problem for many prior art toys.

There have been many tricycles devised over the years. Most of these tricycles perform the normal function of moving when pedaled and turning on a radius determined by manipulation of the handlebars controlling the front wheel. Such tricycles educate the motor responses of the child and offer some excitement. However, most prior art tricycles have a high center of gravity and are, consequently, dangerous to drive at more than moderate speeds. Recently, tricycles having a lower center of gravity have been devised and are to be found on the market. Such tricycles are easier to turn at higher speeds and offer increased excitement. They do not, however, offer maximum safety protection for a child. Such tricycles are often quite expensive and insufficiently durable.

It is an object of the present invention to provide a new and improved ride-on tricycle.

It is another object of the present invention to provide a sturdy, inexpensive tricycle for a child.

It is still another object of the present invention to provide a new and improved tricycle having an especially low center of gravity together with a unique turning action.

It is another object of the present invention to provide an especially safe, yet exciting, tricycle for a child.

SUMMARY OF THE INVENTION

The foregoing and other objects of the invention are accomplished by a tricycle which has an inverted U-shaped frame member supporting a front wheel at its center and a pair of caster-mounted rear wheels, one at each opening end of the U-shaped member. A seat is suspended across the opening ends of the U-shaped member in such a position that a child riding the tricycle is enclosed within the boundaries of the U-shaped member. The seat is positioned below the frame and supports the child just off the ground at the extreme rear of the tricycle so that maximum stability is provided. The caster wheels at the rear of the U-shaped member provide an exciting and rapid turn characteristic so that the vehicle may be easily put into 360° turns. The width of the U-shape member and its position surrounding the child provide extraordinary protection for a child should, in any way, the vehicle be caused to topple or run into an obstacle.

Other objects, features and advantages of the invention will become apparent from a reading of the specification taken in conjunction with the drawings in which like reference numerals refer to like elements in the several views.

BRIEF DESCRIPTION OF THE DRAWINGS

FIG. 3 is an enlarged cross-sectional side view of a detail of the connection of the seat and caster wheel to the U-shaped frame member of the invention shown in FIGS. 1 and 2;

FIG. 4 is an enlarged cross-sectional rear view of a detail of the connection of the seat and the caster wheel to the U-shaped frame member of the invention shown in FIGS. 1 and 2;

FIG. 5 is a perspective view of a seat used in the invention of FIGS. 1 and 2.

DESCRIPTION OF THE PREFERRED EMBODIMENT

Figure 1:
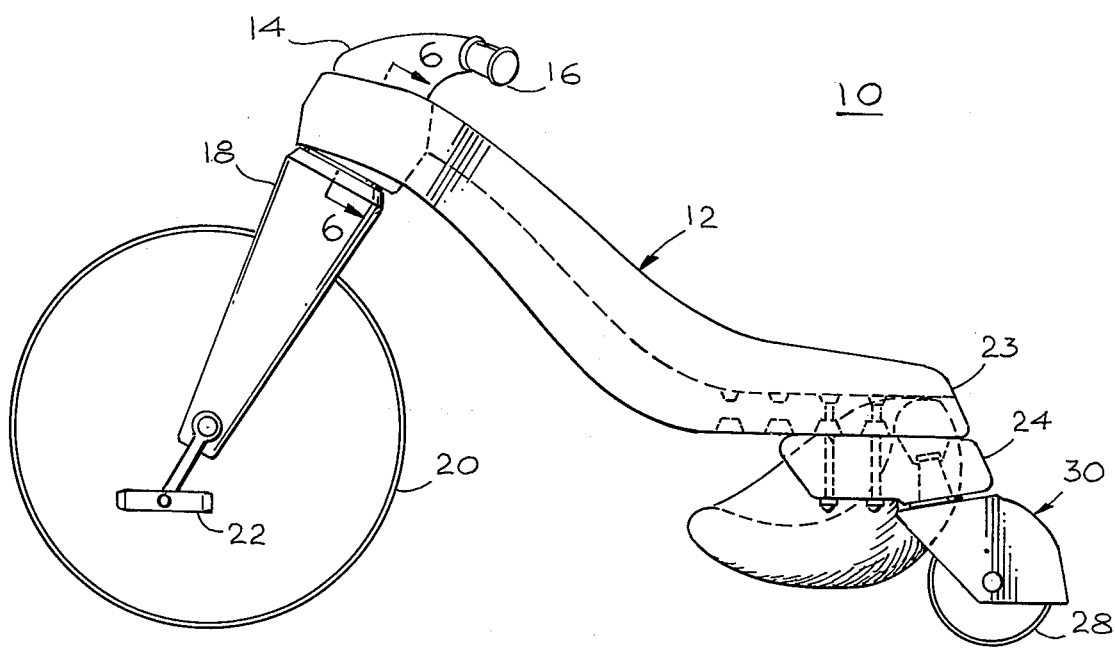
FIG. 1 is a side view of a toy tricycle constructed in accordance with this invention.
Figure 2:
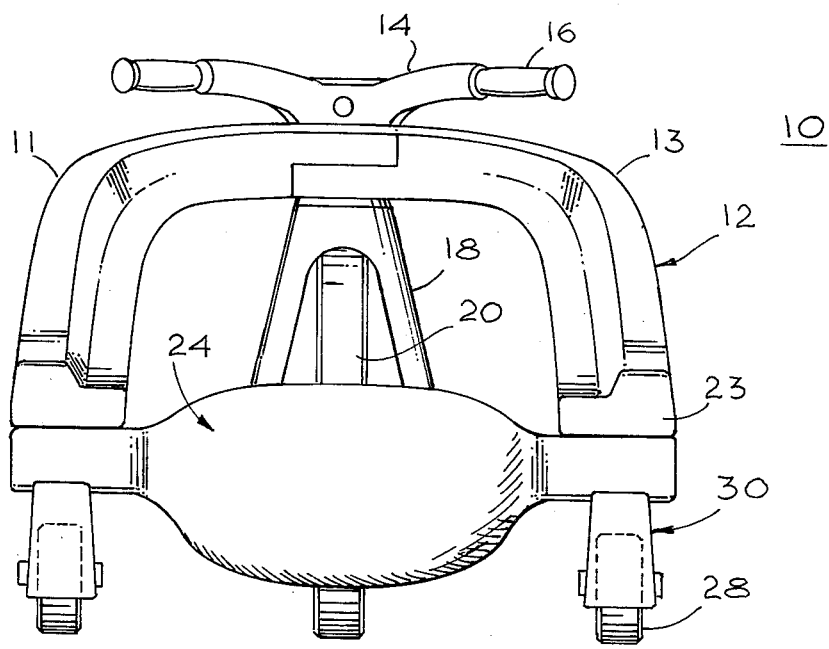
FIG. 2 is a rear view of the toy tricycle shown in FIG. 1.

Referring now to the drawings and, more particularly, to FIGS. 1 and 2, there are shown, respectively, side and rear views of a ride-on tricycle 10 constructed in accordance with the invention. The tricycle 10 includes a generally U-shaped frame member 12 which supports a pair of handlebars 14 having grips 16 for changing the direction of a fork 18.

The fork 18 supports a wheel 20 which is driven in a conventional manner by a pair of pedals 22. Obviously, pressure applied to the grips 16 will turn the handlebars 14 and the attached fork 18 thereby causing the wheel 20 to change course and steer the tricycle 10. Furthermore, operation of the pedals 22 by pressure thereupon will cause the wheel 20 to rotate and drive and tricycle 10 forward or backward depending on the direction of the pressure.

Figure 6:
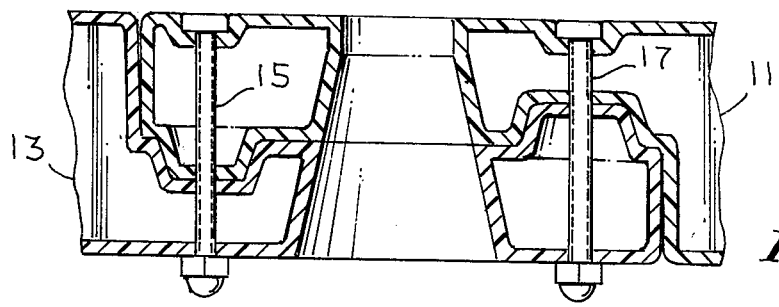
FIG. 6 is an enlarged cross-sectional view of the structure of the U-shaped frame member where the fork and handlebars of the front wheel are attached.

FIG. 6 which is an enlarged cross-sectional view taken along the lines 6—6 in FIG. 1 illustrates a preferred embodiment in which the U-shaped frame member 12 is comprised of two sections. These sections 11 and 13 are bolted together at interlocking flanges to provide the rigidity of a one-piece frame. The dimensions of frame 12 provide substantial protection for a child. These dimensions also enhance the structural integrity of the tricycle 10 thereby assuring that it will last for an extended period.

As may be seen in FIGS. 1 and 2, the U-shaped frame 12 progresses rearwardly from the position at which the fork 18 is supported. At the rear of the tricycle 10, the frame 12 connects at each of its ends 23 to a depending seat 24. A preferred embodiment of the seat 24 is shown in the perspective view of FIG. 5. The seat 24 may be molded from a material such as a plastic and is essentially, a one-piece member having a pair of ends 25, a seating surface 26, and a back 27. The seating surface 26 and back 27 are contoured to fit the anatomy of a child. As is shown in FIG. 2, the seat 24 is secured across the open ends 23 of the U-shaped frame 12 so that the seat 24 depends therefrom and just clears the ground below the frame 12. Mounted to the seat 24 are a pair of rear wheels 28 positioned in a caster mount 30.

FIGS. 3 and 4 illustrate the details of the mounting of the seat 24 to the frame 12 and of the rear wheels 28 to the seat 24. Each of the rear wheels 28 is supported by the caster member 30 which includes a cover member 32 which is supported by and rotates in the seat member 24 by a generally cylindrical axle 34. The axle 34 is slightly tapered so that it is actually frusto-conical in shape and fits into a similarly shaped cavity 36 passing through each of the ends 25 of the seat 24. As may be seen from FIGS. 3 and 4, a nylon bearing 35 fits between axle 34 and cavity 36 so that the axle 34 rotates in cavity 36. The axle 34 is secured to the seat 24 by an upper flange 38 which is secured to the axle 34 by a screw or rivet 40. The center of the axle 34 and of the cavity 36 are concentric and slope slightly toward the rear from the vertical so that the cover 32 which carries the wheel 28 essentially follows the direction of the front wheel. The cover 32 may be molded as shown in FIG. 4 from a nylon material to provide a substantial and sturdy cross section for supporting the wheel 28. The cover 32 carries therein a pair of openings 40 which support an axle 42 for each wheel 28. Obviously, operation of the front wheel 20 causes the tricycle 10 to advance and the rear wheels 28 to function.

Each of the rear wheels 28 is mounted to seat 24 which is in turn mounted at the rear of the tricycle 10 to the ends 23 of the frame 12. This mounting is accomplished, as may be seen in FIGS. 3, 4, and 5, by a pair of upwardly extending flanges 46 encircling openings on each of the ends 25 each of which is adapted to mate with a cavity 48 along the bottom of the ends 23 of the frame 12. In a preferred embodiment, four cavities 48 are provided in each end 23 so that the seat 24 may be moved forward and backward to provide a slightly different effective length for the U-shaped member 12 and, consequently, a slightly different fit for a child. When the flanges 46 are positioned in a pair of the cavities 48, bolts 50 may be positioned in holes 44 and the seat 24 secured to the frame 12 by nuts 52.

In general, all of the parts of the tricycle 10 may be constructed of well-known materials, such as moldable plastic, which are adapted to provide light weight and substantial strength. In a preferred embodiment, the frame 12, the seat 24, and the fork 18 are all molded of high density polyethylene. The cross-section of the frame 12 shown in FIG. 3 illustrates the hollow shell construction which provides extreme structural rigidity. Each of the members 11 and 13, the seat 24, and the fork 18 is molded to have an outer shell surrounding a hollow interior so that the strength of this tubular form of construction is provided.

The tricycle 10 provides especially exciting action because of the unique features of its construction. First, the caster mounted rear wheels 28 allow the tricycle 10 to be turned very quickly simply by manipulating the handlebars 14. In fact, the tricycle 10 may be easily put into a 360° turn by a slight turn of the handlebars 14 when the tricycle is traveling at any substantial speed. On the other hand, the extremely low center of gravity, just off the ground, provided by the seat which is mounted between the rear wheels, and below the frame 12, maintains the tricycle 10 in an upright position even though substantial turns are rapidly made. Furthermore, the frame 12 so encircles a child positioned in the seat 24 that if the tricycle 10 should tip to one side or the other, or hit an obstacle, the external surface of the frame 12 will receive substantially all of the shock.

Obviously, other materials and construction techniques could be used to provide a tricycle such as that described herein. For example, various metals may be molded to form the shapes of the frame, casters, handlebars, forks and the like, although at substantially greater expense. Furthermore, various changes might be made in form of the tricycle while retaining the inventive concepts. Thus, while there has been shown and described a preferred embodiment, it is to be understood that various other adaptations and modifications may be made which will fall within the spirit and scope of the invention.

What is claimed is:

1. In combination with a tricycle having a front fork rotatably supporting a pedal-driven wheel, a pair of handle bars connected to said fork and a pair of castered rear wheels, the improvement which comprises:
    a U-shaped frame having a pair of open ends; first means rotatably connecting said fork to the center of said frame;
    an elongated seat having a pair of ends, an indentation and a back, said indentation and said back being contoured to fit the anatomy of a child, each of said ends being provided with means for affixing one of said castered wheels;
    second means for affixing said ends of said seat to said open ends of said frame for connecting said seat thereto in depending relation therewith and with said castered wheels.

2. In combination with a tricycle having a front fork rotatably supporting a pedal-driven wheel, a pair of handle bars connected to said fork and a pair of castered rear wheels, the improvement which comprises:
    a U-shaped frame having a pair of open ends, the underside of each of said open ends being provided with a plurality of cavities spaced uniformly along each of said open ends and progressing forwardly toward the center of said frame;
    first means rotatably connecting said fork to the the center of said frame;
    an elongated seat having a pair of ends, an identation and a back, said identation and said back being contoured to fit the anatomy of a child, each of said ends being provided with a frusto-conical axle cavity, at least one opening and an upwardly extending flange encircling said opening, said upwardly extending flanges being adapted to mate with an associated one of said plurality of cavities in said undersides of said open ends, whereby said seat may be moved forward and backward along said underside to provide different effective lengths for said U-shaped frame;
    second means passing through said openings in said ends of said seat and associated ones of said cavities in said open ends of said frame for connecting said seat thereto in depending relation therewith and with said castered wheels; and
    a frusto-conical axle rotatably connected to each of said frusto-conical axle cavities for connecting said castered rear wheels to said seat.

3. An improvement as stated in claim 2 wherein said frame is of hollow shell construction and is molded in two sections of high density polyethylene material, each of said sections including an interlocking flange at an end opposite said open end adapted to be bolted to the other of said interlocking flanges to provide the rigidity of a one-piece frame.

4. An improvement as stated in claim 2 wherein said first means includes a frusto-conical opening for receiving said fork.

* * * * *

UNITED STATES PATENT AND TRADEMARK OFFICE
CERTIFICATE OF CORRECTION

PATENT NO. : 4,327,929
DATED : May 4, 1982
INVENTOR(S) : John M. Melzian

It is certified that error appears in the above-identified patent and that said Letters Patent are hereby corrected as shown below:

Column 3, line 21 "openings 40" should read --openings 41--

IN THE DRAWINGS:

Sheet 2, Figure 4 the openings designated by reference number 40 should read --41--

Signed and Sealed this

Fourteenth Day of June 1983

[SEAL]

Attest:

DONALD J. QUIGG

Attesting Officer

Acting Commissioner of Patents and Trademarks